United States Patent Office 2,885,370
Patented May 5, 1959

2,885,370

METHOD OF PREPARING POLYMERS OF MONOMERIC CYCLOTRISILAZANES

Stephen J. Groszos, Darien, and Janet A. Hall, Stamford, Conn., assignors to American Cyanamid Company, New York, N.Y., a corporation of Maine No Drawing. Application October 3, 1957
Serial No. 688,095

8 Claims. (Cl. 260—2)

This invention relates broadly to a method of preparing polymers of monomeric cyclotrisilazanes and, more particularly, represented by the general formula (I)

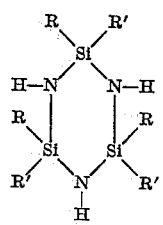

wherein each R and R' represents a carbocyclic radical, which can be the same or different and which, preferably, are the same. A more specific example of a compound embraced by Formula I is 2,2,4,4,6,6-hexaphenyl-cyclotrisilazane, the formula for which is (II)

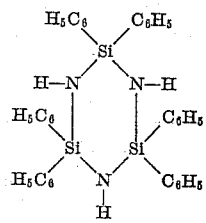

Illustrative examples of carbocyclic radicals represented by R and R' in Formula I are phenyl, mono- and polyalkylphenyls (e.g., tolyl, xylyl, mono-, di- and triethyl, -propyl, -isopropyl, -butyl, -allyl, etc., phenyls), biphenylyl or xenyl, naphthyl, mono- and polyalkylnaphthyls (e.g., methylnaphthyl, diethylnaphthyl, tripropylnaphthyl, etc.), tetrahydronaphthyl, anthryl, mono- and polyalkylanthryls (e.g., mono-, di-, tri- and tetramethyl, -ethyl, -propyl, -butyl, etc., anthryls), the various cycloalkyls (e.g., cyclopentyl, cyclohexyl, cycloheptyl, etc.), the various cycloalkenyls (e.g., cyclopentenyl, cyclohexenyl, cycloheptenyl, etc.), and halogenated (chlorinated, brominated, fluorinated and iodinated) carbocyclic radicals coresponding to those mentioned above, e.g., mono-, di-, tri- and tetra-chloro-, bromo-, fluoro- and iodophenyl, etc. Other examples include the alkoxy (e.g., methoxy, ethoxy, propoxy, butoxy, etc.) carbocyclic radicals corresponding to the carbocyclic hydrocarbon radicals given above by way of example. Still other examples of carbocyclic radicals will be apparent to those skilled in the art from the foregoing illustrative examples.

The compounds used in practicing the present invention and which are embraced by Formula I range from semisolids to solids in the normal state. They have excellent thermal resistance (often referred to as "thermal stability"), that is, excellent high-temperature resistance, as do also the polymers thereof. Hence they are particularly useful in applications requiring high-temperature resistance, e.g., as heat-exchange media. The monomers and polymers (which range from viscous liquids to solid resins) are useful as modifiers of other polymeric bodies or systems, including the various known synthetic resins, and also as modifiers of (or additives to) the various natural gums and resins.

The compounds embraced by Formula I are also useful as chemical intermediates. For example, they can be employed as a reactant with ingredients including an active carbonyl-containing compound, e.g., an aldehyde or a compound engendering an aldehyde such, for instance, as formaldehyde, acetaldehyde, propionaldehyde, butyraldehyde, valeraldehyde, acrolein, methacrolein, furfural, crotonaldehyde, heptaldehyde, octaldehyde, benzaldehyde, hydroxyaldehydes (e.g., aldol, glycollic aldehyde, glyceraldehyde, etc.), paraformaldehyde, trioxane, hexamethylenetetramine, dimethylol urea, trimethylol melamine, methylol acrylamide, etc., or mixtures thereof, to yield a new and useful class of resinous compositions.

Both the monomers and polymers are useful as flame-resisting compositions or as components of such compositions; as plasticizers; and in various agricultural applications including use as the active ingredient in insecticides, bactericides, germicides, fungicides, pesticides and the like.

Other uses of the monomers as a chemical intermediate include use as a reactant with boronic acid, borinic acid, and the various B-substituted boronic and borinic acids, including the B-hydrocarboboronic and -borinic acids, e.g., phenylboronic acid, diphenylborinic acid, n-butylboronic acid, etc.; as a reactant in preparing silicon esters, e.g., as a reactant with a monohydric or polyhydric alcohol (including cellulose) in preparing such esters; and as a reactant with monoamines, polyamines and other active hydrogen-containing materials. They also may be used as cross-linking agents, for instance in cross-linking hydroxylic polymers, e.g., polyvinyl alcohol, hydroxy-containing alkyd resins, phenolic resins, urea resins, melamine and other aminotriazine resins, including those obtained by reacting a phenol, a urea, an aminotriazine (e.g., melamine), etc., with an aldehyde, a ketone or other active carbonyl-containing compound. The monomers embraced by Formula I and the polymers thereof also may be employed in textile-treating applications, e.g., as agents for treating cellulosic, proteinaceous (e.g., wool) and other textile materials in filament, yarn, fabric or other form.

The polymers of the monomeric cyclotrisilazanes embraced by Formula I are of the thermoplastic type or kind. They are useful in coating, impregnating, laminating, adhesive, molding and other applications where thermoplastic synthetic resins and other thermoplastic polymeric bodies are now employed.

In any of the aforementioned and other applications or uses, one can employ a single compound of the kind embraced by Formula I (or a polymer thereof where applicable), or a plurality of such compounds or polymers in any proportions.

The cyclotrisilazanes of the kind embraced by Formula I are prepared, for example, by contacting (1) a compound represented by the general formula (III)

wherein R and R' each represents a carbocyclic radical, which may be the same or different (numerous examples of which have been given hereinbefore), and X and X' each represents a halogen selected from the class consisting of chlorine and bromine with (2) anhydrous ammonia in an amount corresponding to at least 9 moles thereof (preferably more than 9, e.g., 9.1 to 20 or more, moles thereof) for each 3 moles of the compound represented by Formula III, and isolating a compound represented by the first-given formula from the resulting reaction mass. Preferably R and R' each represents the same carbocyclic radical, specifically the same aryl radical, e.g., the phenyl radical, and X and X' each represents chlorine. Compounds wherein X and X' each represents iodine or fluorine are not precluded, where such compounds are available or can be prepared by known methods, but no particular advantages ordinarily accrue from their use in the production of compounds of the kind embraced by Formula I, with the possible exception that in some cases the isolation of the cyclotrisilazane reaction product may be facilitated by the use of dicarbocyclyldiiodosilane as a reactant.

The reaction is normally carried out under anhydrous conditions using, for example, anhydrous ammonia. The reaction may be effected over a wide range of temperatures. The reaction may be effected at ambient temperatures (e.g., 20°–30° C.), or sub-ambient temperatures (e.g., down to, say, −60° C.), or at above ambient temperatures, e.g., up to 100° C. or even as high as 150° or 200° C.

The reaction advantageously is effected in an inert (substantially completely inert), anhydrous (substantially completely anhydrous), liquid medium. By "inert" or "substantially completely inert" anhydrous, liquid medium is meant an anhydrous liquid medium which is so inert or non-reactive toward the reactants and the reaction product that it will not affect the course of the reaction or the constitution of the reaction product. By "anhydrous" or "substantially completely anhydrous" liquid medium in the foregoing sentences is meant one which contains no more than a trace of water, and by "liquid medium" is meant a medium which is liquid at the temperature employed in effecting the reaction. In other words, the inert, anhydrous, liquid medium in which the reaction advantageously is effected may or may not be a liquid at room temperature or at any other temperature below the reaction temperature. Preferably a liquid medium which is volatile (volatilizable) without decomposition is employed.

Illustrative examples of inert, anhydrous, liquid media in which the reaction between the dicarbocyclyldihalogenosilane and ammonia can be effected include benzene, toluene, xylene, chloroform, carbon tetrachloride, diethyl and dipropyl ethers, any of the saturated alkanes which normally are liquids or are liquid at the particular reaction temperature and pressure employed (e.g., n-hexane and other isomers of hexane or mixtures thereof, the various heptanes, octanes, nonanes, decanes, etc.), chlorinated aliphatic and aromatic compounds, e.g., uns.-tetrachloroethane, propylene chloride, chlorobenzene, etc.

The amount of inert, anhydrous, liquid reaction medium employed may be varied as desired or as conditions may require, but ordinarily the amount thereof is such that the dicarbocyclyldihalogenosilane constitutes from about 1% to about 20% by weight thereof.

At the end of the reaction period the cyclotrisilazane is isolated from the reaction mass, e.g., by filtering the reaction mass to remove the ammonium halide by-product of the reaction, concentrating the filtrate by evaporation or distillation of the liquid reaction medium, and collecting (e.g., by filtration, centrifuging, etc.) the crystalline cyclotrisilazane that separates from the concentrated liquor.

The polymers are obtained, in accordance with the present invention, by heating the corresponding monomeric compound at a temperature above its melting point until a polymer has been formed. If, in making the polymer, the monomer is to be heated above its boiling point, such heating preferably is done while the monomer is contained in a closed reaction zone. Heating of the monomer advantageously is effected while it is under an atmosphere of an inert gas, e.g., nitrogen, argon, helium, etc., but it also may be done under an atmosphere of air or oxygen.

In order that those skilled in the art may better understand how the present invention can be carried into effect, the following examples are given by way of illustration and not by way of limitation. All parts and percentages are by weight unless otherwise stated.

EXAMPLE 1

Twenty (20.0) g. (0.08 mole) diphenyldichlorosilane and 300 ml. anhydrous benzene are charged to a 3-necked, round-bottom flask fitted with stirrer, thermometer, ammonia gas-inlet tube, condenser and drying tube. Ammonia is slowly bubbled into the solution over a period of 2 hours, the total amount of added ammonia being in excess of 0.24 mole. An exothermic reaction takes place and a large amount of finely-divided ammonium chloride (by-product of the reaction) precipitates. The gas-inlet tube is closed and the mixture is heated at 60° C. for 20 minutes.

Heating is discontinued and the benzene solution is gravity-filtered. The ammonium chloride is washed with three 50 ml. portions of benzene and the washings are added to the filtrate. The vacuum-dried precipitate yields about 8.8 g. (0.16 mole) of ammonium chloride.

The filtrate is concentrated to about 100 ml. at atmospheric pressure. After several days, a first crop of colorless, granular crystals is obtained. With two further concentrations of the mother liquor a total yield of 10.4 g. (0.018 mole) of crude 2,2,4,4,6,6-hexaphenylcyclotrisilazane is obtained, representing a yield of 66.7%.

A sample of the product recrystallized twice from benzene melts at 216°–217° C.

| Analysis | Calcd. for $(\phi_2SiNH)_3$ | Found |
|---|---|---|
| M.W. (f.p.-benzene) | 592 | 590. |
| Percent C | 73.05 | 72.99 |
| Percent H | 5.62 | 5.65 |
| Percent N | 7.10 | 7.15 |
| Percent Si | 14.24 | 14.42 |

In Table I are given the results of heating 2,2,4,4,6,6-hexaphenylcyclotrisilazane at various temperatures and under various conditions.

In Table II are given the physical properties of the monomer and some of the polymer fractions identified in Table I.

It was quite surprising and unexpected that the reaction between diphenyldichlorosilane and ammonia should yield a cyclotrisilazane, specifically 2,2,4,4,6,6-hexaphenylcyclotrisilazane, since the reaction between diphenyldichlorosilane and methylamine was found, as shown in Example 2, to yield diphenyldi(methylamino)silane, the formula for which is (IV)

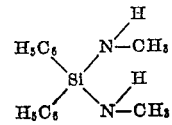

instead of a cyclic compound.

In place of 0.08 mole of diphenyldichlorosilane as a reactant with ammonia in the manner set forth in the foregoing example, one can use 0.08 mole of di-p-chlorophenyldichlorosilane thereby to obtain 2,2,4,4,6,6-hexa-p-chlorophenylcyclotrisilazane in a good yield.

Table I

| Sample No. | T, °C. | Length of Time [1] | Conditions | Physical Characteristics of the Material | Miscellaneous Notes |
|---|---|---|---|---|---|
| M | 217 | | Atm. pressure, open tube. | Melting point | Resulting cryst. solid remelts at 213°–217° C. |
| M | 513 | | do | Approximate boiling point. | |
| 1 | 450 | 24 hours | Nitrogen atm., sealed tube. | Colorless viscous liq | Viscous liq. is low M.W. Si-N polymer. |
| 2 | 500 | 3 hours, 10 min | do | do | Do. |
| 3 | 550 | 30 min | Tube sealed in air. | do | Do. |
| 4 | 600 | 10 min | do | Light tan solid | Do. |
| 5 | 700 | 5 min | Nitrogen atm., sealed tube. | Dark brown resin | |

[1] Heating was discontinued when visual observation indicated increased viscosity. The polymeric products increase in M.W. as temperature is increased.

Table II

| Compound | Solvent | Solubility | M.P. or Softening Point, °C. | Miscellaneous Notes |
|---|---|---|---|---|
| Monomer | $H_2O$, 25° C | Insoluble | M.P., 216–217 | |
| Do | $H_2O$, 100° C | do | | |
| Do | Ethanol, 25° C | Sl. soluble | | |
| Do | Ethanol, 100° C | Soluble | | Hydrolysis occurs with evolution of $NH_3$. |
| Do | Benzene | Very soluble | | |
| Do | Pet. ether | Sl. soluble | | |
| Do | Chloroform | Soluble | | |
| Do | Pyridine | do | | |
| Do | Glacial acetic acid | Sl. soluble | | |
| Do | Dioxane | Very soluble | | |
| Do | 50% dioxane–50% $H_2O$, 25° C. | Soluble | | |
| Do | 50% dioxane–50% $H_2O$, 100° C. | do | | Do. |
| 2* | $H_2O$, 25° C | Insoluble | 300 | |
| 2* | Ethanol | Sl. sol. to insol | | |
| 2* | Benzene | do | | |
| 4* | do | Insoluble | 300 | |
| 1* | do | Very soluble | S. P., 280 | |

*Numbers refer to polymer fraction given in Table I.

EXAMPLE 2

A comparison of this example with Example 1 shows the unobvious and unpredictable nature of the present invention.

Sixty-three and three-tenths (63.3) g. (0.25 mole) diphenyldichlorosilane and 600 ml. anhydrous ether are charged to a 3-necked, round-bottomed flask fitted with stirrer, methylamine gas-inlet, condenser and drying tube. Methylamine is slowly bubbled into the solution over a period of 2 hours, the total amount of added methylamine being in excess of 1 mole. An exothermic reaction takes place and a large amount of gelatinous methylamine hydrochloride precipitates.

The ether is stripped, leaving a gummy solid which is transferred to a Soxhlet extractor and continuously extracted for 8 hours with anhydrous chloroform. Volatile solvents are stripped and the product distilled at 125°–126° C./0.65 mm. Thirty-nine and four-tenths (39.4) g. (0.16 mole) of diphenyldi(methylamino)silane, $\varphi_2Si(NHCH_3)_2$, is obtained, representing a yield of 65.0% of the theoretical.

*Analysis.*—Calcd. for $\varphi_2Si(NHCH_3)_2$: Percent C, 69.37; percent H, 7.49. Found: percent C, 69.65; percent H, 7.56.

EXAMPLE 3

Example 1 is repeated exactly with the exception that 0.08 mole of diphenyldibromosilane is used instead of 0.08 mole of diphenyldichlorosilane. 2,2,4,4,6,6-hexaphenylcyclotrisilazane is obtained in a yield corresponding to about 65% of the theoretical.

EXAMPLE 4

Essentially the same procedure is followed as described under Example 1 with the exception that 0.08 mole of di-p-tolyldichlorosilane is employed in place of 0.08 mole of diphenyldichlorosilane. 2,2,4,4,6,6-hexa-p-tolyl-cyclotrisilazane is the primary product of the reaction, and the yield of crude product is about 70% of the theoretical.

EXAMPLE 5

Essentially the same procedure is followed as described under Example 1 with the exception that 0.08 mole of dicyclohexyldichlorosilane is used instead of 0.08 mole of diphenyldichlorosilane. The product, 2,2,4,4,6,6-hexacyclohexylcyclotrisilazane, is obtained in a yield (for the crude product) corresponding to about 67% of the theoretical.

EXAMPLE 6

This example illustrates the use of 2,2,4,4,6,6-hexaphenylcyclotrisilazane as a chemical intermediate (more particularly as a reactant with an aldehyde, specifically formaldehyde) in making condensation-type resinous materials.

| | Parts |
|---|---|
| N-triphenyl-B-triaminoborazole | 133.6 |
| 2,2,4,4,6,6-hexaphenylcyclotrisilazane | 33.4 |
| Aqueous formaldehyde (approximately 37.1% HCHO) | 518.4 |
| Aqueous ammonia (approximately 28% $NH_3$) | 53.3 |
| Sodium hydroxide in 65 parts water | 0.5 |

All of the above ingredients are heated together under reflux at the boiling temperature of the reaction mass for 30 minutes, yielding a resinous syrup. This syrup is potentially heat-curable, as evidenced by the fact that when a small amount of a curing agent is incorporated therein, e.g., about 1.0% by weight thereof of phthalic anhydride, sulfamic acid, maleic anhydride, maleic acid, melamine pyrophosphate, etc., and the resulting syrup is heated on a 140° C. hot plate, it cures to a substantially insoluble, substantially infusible state.

To the main batch of syrupy reaction product is now added sulfamic acid in an amount sufficient to bring the syrup to a pH of about 3 to 4. The syrup is heated for a few minutes more in order to incorporate the sulfamic acid thoroughly therethrough.

The resulting syrup is mixed with 280 parts of alpha-cellulose in flock form and 2.8 parts of a mold lubricant, specifically zinc stearate, to form a molding (moldable) composition. The wet molding compound is dried at 60° C. until sufficient moisture has been removed so that the composition can be molded satisfactorily. A sample of the dried and ground molding compound is molded for 10 minutes at 180° C. under a pressure of about 5000 pounds per square inch. The molding compound shows better flow during molding than does a similar molding composition in which is used a resinous material that has been similarly made but omitting the cyclotrisilazane from the formulation; that is, using 167.0 parts of N-triphenyl-B-triaminoborazole instead of 133.6 parts of said borazole plus 33.4 parts of the above-mentioned hexaphenylcyclotrisilazane. The molded piece is hard, well-cured, has a good surface finish, and also excellent resistance to heat.

EXAMPLE 7

This example illustrates the use of a polymer of this invention, specifically homopolymeric 2,2,4,4,6,6-hexaphenylcyclotrisilazane, as a modifier of a synthetic resin, more particularly a melamine-formaldehyde resin. The polymeric cyclotrisilazane is one that has been produced as described with reference to sample No. 4 in Table I. It is a light-tan solid.

| | Parts |
|---|---|
| Melamine-formaldehyde resin [1] | 487 |
| Polymeric 2,2,4,4,6,6-hexaphenylcyclotrisilazane | 163 |
| Alpha-cellulose | 350 |
| Mold lubricant, specifically zinc stearate | 10 |

[1] This resin is a dry, heat-curable material obtained by reaction of melamine and formaldehyde in the ratio of 1 mole of the former to 2 moles of the latter.

The above ingredients are blended together in a mixing unit for 1¼ hours, the relatively large lumps of the polymeric cyclotrisilazane (modifying polymer) thereby being broken up to smaller size. The mixture is further worked on differential rolls having a clearance of 60 mils therebetween. The hot roll (fast roll) is at a temperature of about 150° C. at the beginning and about 140° C. at the end, while the temperature of the cold roll (slow roll) is 100° C. The modifying polymer blends in readily within 2 to 3 minutes. The sheet forms on the cold roll, is transferred to the hot roll in 4 to 6 minutes, and is removed from the latter in 7½ minutes. The sheet shows good plasticity on the rolls and is removed in a single sheet. It is translucent, cream-colored, and very flexible and strong when cold. The sheet is broken and ground in an Abbé cutter through a ⅛" screen to form a molding compound for test purposes.

A molded article is produced by molding a sample of the molding compound for 5 minutes at 165° C. under a pressure of about 4500 pounds per square inch. The molded pieces has a mold shrinkage and an after-shrinkage that are lower than the mold shrinkage and after-shrinkage of a similarly molded melamine-formaldehyde molding compound containing no polymeric 2,2,4,4,6,6-hexaphenylcyclotrisilazane and which has been cured for 5 minutes under the same temperature and pressure conditions.

We claim:
1. The method which comprises heating, at a temperature above its melting point, an undissolved, preformed monomeric compound represented by the general formula

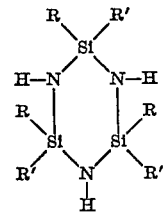

wherein each R and R' represents a carbocyclic radical, and continuing the said heating at a temperature above the melting point of the monomeric compound until the latter has been converted to a polymer thereof having the molecular weight desired.

2. A method as in claim 1 wherein the heating of the undissolved, preformed, monomeric compound is effected in a closed reaction zone.

3. A method as in claim 1 wherein the heating of the undissolved, preformed, monomeric compound is effected in a closed reaction zone and under an atmosphere of an inert gas.

4. A method as in claim 1 wherein the heating of the undissolved, preformed monomeric compound is effected in a closed reaction zone, and at a maximum temperature above the melting point of the monomeric compound which is within the range of from about 450° C. to about 700° C.

5. A method as in claim 1 wherein the heating of the undissolved, preformed, monomeric compound is effected in a closed reaction zone, under an atmosphere of an inert gas, and at a maximum temperature above the melting point of the monomeric compound which is within the range of from about 450° C. to about 700° C.

6. The method which comprises heating undissolved, preformed, monomeric 2,2,4,4,6,6 - hexaphenylcyclotrisilazane at a temperature above its melting point of 216°–217° C., and continuing the said heating of the said monomeric 2,2,4,4,6,6 - hexaphenylcyclotrisilazane until the latter has been converted to a polymer thereof having the molecular weight desired, all of the heating of the aforesaid monomeric compound being effected in a closed reaction zone, and the maximum temperature to which the said monomeric compound is heated being within the range of from about 450° C. to about 700° C.

7. A method as in claim 6 wherein the specified heating of the undissolved, preformed, monomeric 2,2,4,4,6,6-hexaphenylcyclotrisilazane is done while the said compound is under an atmosphere of an inert gas.

8. A method as in claim 7 wherein the inert gas is nitrogen.

References Cited in the file of this patent

UNITED STATES PATENTS

| 2,462,635 | Haber | Feb. 22, 1949 |
| 2,553,314 | Haber | May 15, 1951 |
| 2,579,416 | Cheronis | Dec. 18, 1951 |
| 2,687,163 | Speier | Apr. 20, 1954 |

UNITED STATES PATENT OFFICE
Certificate of Correction

May 5, 1959

Patent No. 2,885,370

Stephen J. Groszos et al.

It is hereby certified that error appears in the printed specification of the above numbered patent requiring correction and that the said Letters Patent should read as corrected below.

Column 1, line 17, after "particularly" insert —monomeric cyclotrisilazines—; column 5, lines 58 and 60, for "$\varphi_2Si(NHCH_3)_2$", each occurrence, read

columns 5 and 6, Table I, sixth column thereof, first item, for "solid re" read —solid re- —; column 7, line 59, for "pieces" read —piece—.

Signed and sealed this 15th day of September 1959.

[SEAL]

Attest:
KARL H. AXLINE,
*Attesting Officer.*

ROBERT C. WATSON,
*Commissioner of Patents.*